(12) United States Patent
Fix et al.

(10) Patent No.: US 11,403,386 B2
(45) Date of Patent: Aug. 2, 2022

(54) ENCRYPTED MEMORY DEVICE (71) Applicant: BAUSCH HEALTH IRELAND LIMITED, Dublin (IE)

(72) Inventors: Richard L. Fix, Bothell, WA (US); Randy Holmberg, Bothell, WA (US)

(73) Assignee: Bausch Health Ireland Limited, Dublin (IE)

( * ) Notice: Subject to any disclaimer, the term of this patent is extended or adjusted under 35 U.S.C. 154(b) by 294 days.

(21) Appl. No.: 16/556,403

(22) Filed: Aug. 30, 2019

(65) Prior Publication Data
US 2020/0074068 A1 Mar. 5, 2020

Related U.S. Application Data

(60) Provisional application No. 62/725,827, filed on Aug. 31, 2018.

(51) Int. Cl.
*G06F 21/44* (2013.01)
*G06Q 30/00* (2012.01)
*H04L 9/32* (2006.01)

(52) U.S. Cl.
CPC ......... *G06F 21/44* (2013.01); *G06Q 30/0185* (2013.01); *H04L 9/3239* (2013.01); *G06F 2221/2103* (2013.01)

(58) Field of Classification Search
CPC .................................................... G06F 21/44
See application file for complete search history.

(56) References Cited

U.S. PATENT DOCUMENTS

| | | | |
|---|---|---|---|
| 7,006,874 B2 | 2/2006 | Knowlton et al. | |
| 7,115,123 B2 | 10/2006 | Knowlton et al. | |
| 7,229,436 B2 | 6/2007 | Stern et al. | |
| 7,258,674 B2 | 8/2007 | Cribbs et al. | |
| 7,267,675 B2 | 9/2007 | Stern et al. | |
| 7,311,679 B2 | 12/2007 | Desilets et al. | |
| 7,373,521 B1 * | 5/2008 | Kawahara | G06F 21/725 713/193 |
| 7,452,358 B2 | 11/2008 | Stern et al. | |
| 7,473,251 B2 | 1/2009 | Knowlton et al. | |
| 7,481,809 B2 | 1/2009 | Stern et al. | |
| 7,957,815 B2 | 6/2011 | Wyeth et al. | |
| 8,142,200 B2 | 3/2012 | Crunkilton et al. | |
| 8,152,904 B2 | 4/2012 | Slobodzian et al. | |

(Continued)

*Primary Examiner* — Simon P Kanaan
(74) *Attorney, Agent, or Firm* — Thompson Hine LLP (57) ABSTRACT

In one implementation, a system for detecting counterfeit accessories that are consumable, disposable, or otherwise user replaceable is disclosed. The system includes a host controller, a processor, and a computer-readable storage medium that includes instructions. Upon execution by the processor, the instructions cause the system to perform operations. The operations include obtaining an identifier of an accessory, a current value of usage data for the accessory, and a usage digest of the current value from a storage device associated with the accessory. An expected usage digest is generated based on the current value, the identifier, and a host secret. The expected usage digest is compared with the usage digest and the current value with a threshold usage value. The accessory is activated with the host controller responsive to the expected usage digest being identical to the usage digest and the current value satisfying the threshold usage value.

23 Claims, 5 Drawing Sheets

(56) References Cited

U.S. PATENT DOCUMENTS

| | | |
|---|---|---|
| 8,180,458 B2 | 5/2012 | Kane et al. |
| 8,221,410 B2 | 7/2012 | Knowlton et al. |
| 8,425,435 B2 | 4/2013 | Wing et al. |
| 8,512,250 B2 | 8/2013 | Quistgaard |
| 8,515,553 B2 | 8/2013 | Schenck |
| 8,551,186 B1 * | 10/2013 | Strand ................. G06F 21/74 |
| | | 726/35 |
| 8,603,088 B2 | 12/2013 | Stern et al. |
| 8,685,017 B2 | 4/2014 | Stern et al. |
| 8,932,238 B2 | 1/2015 | Wing et al. |
| 9,623,267 B2 | 4/2017 | Ulric et al. |
| 9,636,175 B2 | 5/2017 | Stern et al. |
| 10,010,722 B2 | 7/2018 | Wing et al. |
| 2003/0009681 A1 * | 1/2003 | Harada ............ G11B 20/00246 |
| | | 713/193 |
| 2006/0047978 A1 * | 3/2006 | Kawakami ....... G11B 20/00753 |
| | | 713/193 |
| 2012/0203242 A1 * | 8/2012 | Fuerst ................... A61B 90/96 |
| | | 606/118 |
| 2012/0213361 A1 * | 8/2012 | Lim .................... H04L 63/0428 |
| | | 380/44 |
| 2012/0222094 A1 * | 8/2012 | Huebier ............. G07B 17/0008 |
| | | 726/4 |
| 2013/0102937 A1 * | 4/2013 | Ehrenreich ........ A61H 23/0236 |
| | | 601/47 |
| 2014/0180181 A1 * | 6/2014 | von Oepen ........ A61H 23/0245 |
| | | 601/47 |
| 2014/0228721 A1 * | 8/2014 | Ehrenreich ........ A61H 23/0245 |
| | | 601/47 |
| 2017/0262860 A1 * | 9/2017 | Teplinsky .......... G06Q 30/0185 |

* cited by examiner

402 Transmitting a challenge message including a nonce value to a device controller of a storage device associated with an accessory

404 Receiving a response message from the device controller that includes an identifier of the accessory and a response digest based on the nonce value

406 Authenticating the accessory in response to an expected response digest being identical to the response digest

502 Obtaining an identifier of an accessory, a current value of usage data for the accessory, and a usage digest of the current value from a storage device associated with the accessory 504 Generating an expected usage digest based on the current value, the identifier, and a host secret 506 Comparing the expected usage digest with the usage digest and the current value with a threshold usage value 508 Activating the accessory with the host controller response to the expected usage digest being identical to the usage digest and the current value satisfying the threshold usage value

ENCRYPTED MEMORY DEVICE

CROSS-REFERENCE TO RELATED APPLICATIONS

This application claims the benefit of U.S. Provisional Application No. 62/725,827, filed Aug. 31, 2018, the content of which is fully incorporated by reference herein in its entirety.

TECHNICAL FIELD

The invention described herein relates generally to counterfeit detection, although not limited thereto. More specifically, the invention described herein relates to techniques for detecting counterfeit accessories, components, or sub-assemblies of a system that are consumable, disposable, or otherwise user replaceable.

BACKGROUND

Devices used in diagnostic and therapeutic medical procedures often have accessories, components, or sub-assemblies that are consumable, disposable, or otherwise user replaceable. These accessories may have operating parameters or physical characteristics that are established by device manufacturers for such concerns as patient safety and overall device functionality. For various reasons, end users may obtain counterfeit accessories from sources external to the device manufacturer when original accessories become unusable. In some instances such counterfeit accessories may not conform to all of the operating parameters or physical characteristics that the device manufacturer established. As a result, patient safety and overall device functionality may be negatively impacted. Thus, it may be desirable to provide a means of detecting counterfeit accessories to avoid such consequences.

SUMMARY

Embodiments of the invention described herein include systems, methods, and computer-readable storage media for detecting counterfeit accessories, components, or sub-assemblies of a system that are consumable, disposable, or otherwise user replaceable. In an embodiment, a system includes a host controller, a processor, and a computer-readable storage medium that includes instructions. Upon execution by the processor, the instructions cause the system to perform operations. The operations include obtaining an identifier of the accessory, a current value of usage data for the accessory, and a usage digest of the current value from a storage device associated with the accessory. An expected usage digest is generated based on the current value, the identifier, and a host secret. The expected usage digest is compared with the usage digest and the current value with a threshold usage value. The accessory is activated with the host controller responsive to the expected usage digest being identical to the usage digest and the current value satisfying the threshold usage value.

In an embodiment, a system is described herein for detecting a counterfeit accessory. In some embodiments, the system includes a host controller, a processor, and a computer-readable storage medium. In some embodiments, the computer-readable storage medium may include instructions that, upon execution by the processor, cause the system to perform operations that may include, but are not limited to: (a) obtaining an identifier of the accessory, a current value of usage data for the accessory, and a usage digest of the current value from a storage device associated with the accessory generating an expected usage digest based on the current value, the identifier, and a host secret comparing the expected usage digest with the usage digest and the current value with a threshold usage value; and/or (d) activating the accessory with the host controller responsive to the expected usage digest being identical to the usage digest and the current value satisfying the threshold usage value.

In an embodiment, a method is described herein for detecting a counterfeit accessory. In some embodiments, the method may include (a) obtaining an identifier of the accessory, a current value of usage data for the accessory, and a usage digest of the current value from a storage device associated with the accessory; (b) generating an expected usage digest based on the current value, the identifier, and a host secret; (c) comparing the expected usage digest with the usage digest and the current value with a threshold usage value; and/or (d) activating the accessory with the host controller responsive to the expected usage digest being identical to the usage digest and the current value satisfying the threshold usage value.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention. In the drawings, like reference numerals are used to indicate like parts in the various views.

DETAILED DESCRIPTION

Figure 1:
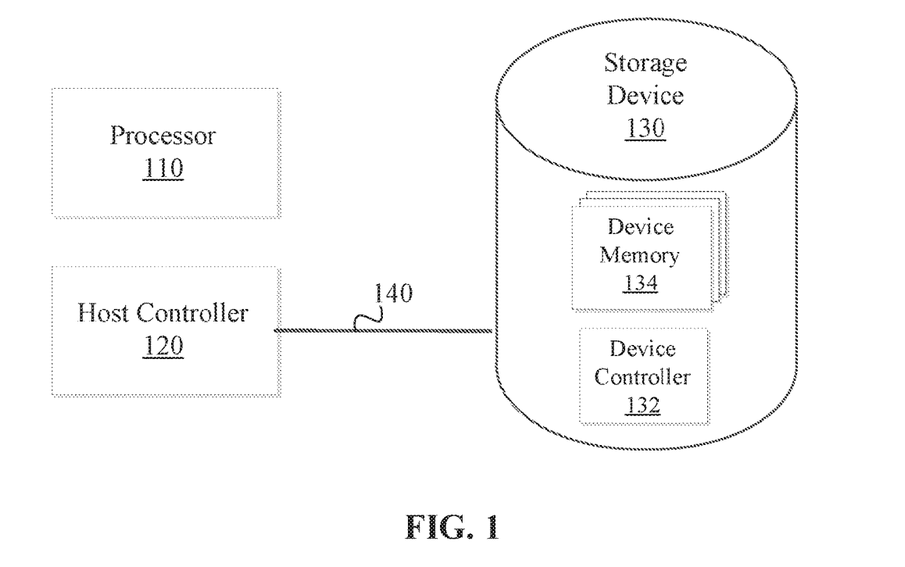
FIG. 1 is a block diagram of an example operating environment that is suitable for implementing aspects of the invention described herein.

Techniques described herein relate to detecting counterfeit accessories, components, or sub-assemblies of a system that are consumable, disposable, or otherwise user replaceable. As used herein, such components, sub-assemblies, or accessories will be referred to as an "accessory". Referring now to the drawings, FIG. 1 discloses an example operating environment 100 for implementing aspects of the invention described herein. Operating environment 100 includes processor 110, host controller 120, and storage device 130. As depicted in FIG. 1, the various elements communicate with each other via a bus structure 140, which may include one or more distinct bus structures.

Processor 110 is generally configured to interpret and execute instruction sequences (e.g., an application or computer program) stored in a non-transitory computer-readable media with one or more threads of execution. Processor 110 is also configured to receive input data from a user via a human-to-machine interface ("HMI") or an external computing device via a network interface and process that input data to produce output data. In an embodiment, processor 110 is implemented using processor 626 of FIG. 6.

Host controller 120 represents a hardware controller of a host system (or electronic device) having one or more accessories, components, or sub-assemblies that are consumable, disposable, or otherwise user replaceable. As used herein, such components, sub-assemblies, or accessories will be referred to as an "accessory". In an embodiment, host controller 120 is a high level hardware controller configured to control the operation and functionality of the system at a system level. In this embodiment, host controller 120 may control the operation and functionality of the system by controlling one or more lower level hardware controllers that manage sub-system or accessory-level operations and functionalities. In an embodiment, host controller 120 is a lower level hardware controller that manages sub-system or accessory-level operations and functionalities, as directed by a high level hardware controller.

In operation, host controller 120 interacts with device controller 132 of storage device 130 to authenticate a corresponding accessory and/or validate data (e.g., usage data) stored in memory 134 concerning that accessory. In an embodiment, host controller 120 initiates an authentication and/or validation process in response to detecting an activation signal associated with the corresponding accessory. To authenticate the corresponding accessory, host controller 120 transmits a challenge to device controller 132 that includes a nonce value. As used herein, "nonce value" refers to a randomly or pseudo-randomly generated alphabetic, numeric, or alphanumeric value.

In an embodiment, storage device 130 is included in the corresponding accessory. In an embodiment, storage device 130 is a dedicated removable device that is separate and distinct from the corresponding accessory. For example, storage device 130 may be implemented as a device similar to a solid state thumb drive or authenticator fob. In an embodiment in which storage device 130 is a dedicated removable device, a proprietary, non-standard interface is provided for storage device 130 to interface with host controller 120. One benefit achieved by this embodiment is a reduced likelihood that other storage devices having form factors that are similar to storage device 130 are mistakenly inserted into the proprietary, non-standard interface.

Figure 2:
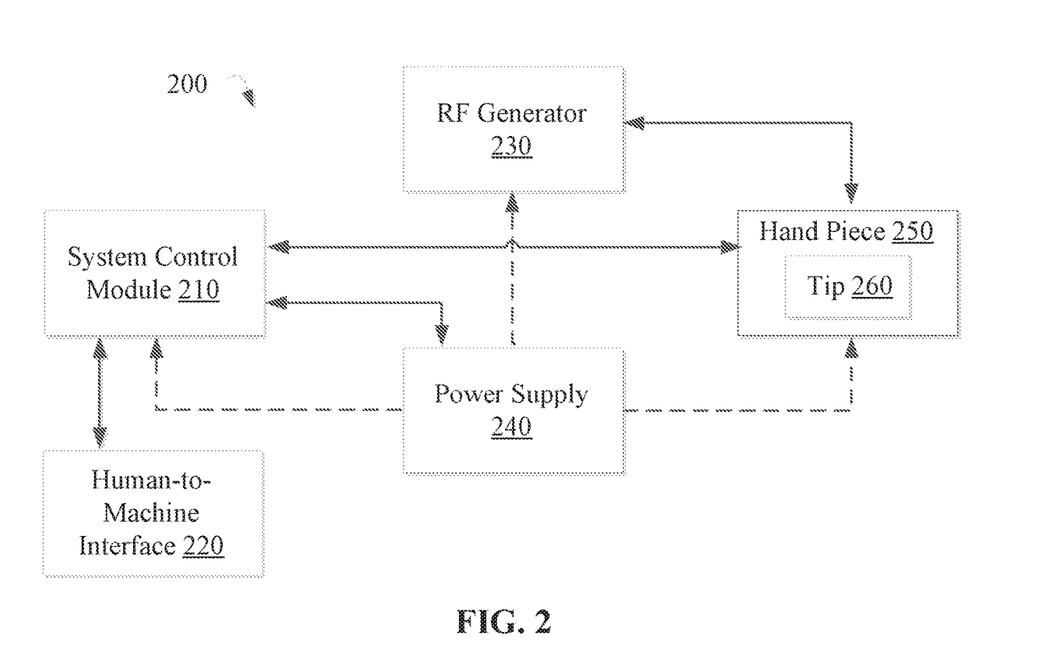
FIG. 2 is a block diagram of an example energy-based therapeutic device that is suitable for implementing aspects of the invention described herein.

Referring to FIG. 2, a block diagram of an energy-based therapeutic device 200 is depicted to represent an example host system (or electronic device) that is suitable for implementing aspects of the invention described herein. In operation, device 200 is configured to deliver energy towards a treatment area of a patient, as part of a therapeutic procedure (e.g., skin tightening, tattoo removal, and the like). While device 200 is described as delivering electrical energy (e.g., radio frequency ("RF") energy) as part of a therapeutic procedure in the embodiment illustrated in FIG. 2, one skilled in the art will recognize that device 200 may also deliver other forms of energy for therapeutic purposes. For example, device 200 may deliver radiant energy (e.g., laser and/or intense pulsed light energy), sound energy (e.g., ultrasound), thermal energy, mechanical energy, and the like.

As depicted in FIG. 2, device 200 includes system control module ("SCM") 210, HMI 220, RF generator 230, power supply 240, hand piece 250, and tip 260. SCM 210 is generally configured to control the operation and functionality of device 200 by controlling the other components of device 200, such as RF generator 230 and power supply 240. At a high level, SCM 210 enables the application of energy to a treatment area of a patient. In that respect, SCM 210 may be considered a high level hardware controller. Lower level hardware controllers located in the other components of device 200 then manage component-level operations, as directed by SCM 210.

In controlling the other components, SCM 210 also monitors status messages received from the lower level hardware controllers and various operational parameters as energy is applied to the treatment area. Examples of such operational parameters include: the peak/average output power at tip 260, the temperature of tip 260, the patient applied electrical/mechanical force, current values of usage data for the other components, and the like. SCM 210 will disable the application of energy to the treatment area when the operational parameters or the status messages from the lower level hardware sequences indicate a fault condition. For example, if a current value of usage data for a particular accessory breaches a threshold value, SCM 210 will disable the application of energy to the treatment area.

HMI 220 provides an interface between an operator and device 200 for exchanging commands, requests, information, data, and the like, which enable the operator to interact with the functionalities provided by device 200. In an embodiment, HMI 220 includes a touch-sensitive touch screen that provides both an input interface and an output interface between the operator and device 220. In an embodiment, HMI 220 may include an audio interface, such as a microphone. In an embodiment, HMI 220 may include physical input devices, such as buttons (e.g., push buttons, rocker buttons, etc.), dials, slider switches, joysticks, click wheels, a keyboard, a pointer device (e.g., a mouse), and the like.

RF generator 230 is configured to generate the RF energy for driving tip 260 when enabled by SCM 210 and in accordance with commands received from an operator via HMI 220. Operation of RF generator 230 is described in greater detail below with respect to FIG. 3.

Power supply 240 is configured to deliver electrical power from an external power source (e.g., an alternating current ("AC") outlet) to the various components of device 200. In an embodiment, power supply 240 is configured to convert alternating AC power obtained from an external power source into direct current ("DC") power for delivery to the various components. In an embodiment, power supply 240 is configured to provide electrical isolation between the external power source and the other components of device 200.

Hand piece 250 is configured to couple tip 260 to the other components of device 200 along the RF propagation path ("RF path") described in greater detail below with respect to FIG. 3. Hand piece 250 is mechanically coupled to device via a flexible conduit enclosing conductors that electrically couple hand piece 250 to the other components. During a therapeutic procedure, an operator positions hand piece 250 (and thereby tip 260) proximate to a treatment area of a patient. The operator instructs device 200 to deliver RF energy to the treatment area by interacting with controls disposed on an outward surface of hand piece 250. For example, hand piece 250 may include controls that enable the operator to initiate/terminate RF energy delivery to the treatment area and adjust an amount of RF energy that is applied to the treatment area. In an embodiment, hand piece 250 is user replaceable component of device 200.

Tip 260 detachably couples with hand piece 250 to deliver RF energy generated by RF generator 230 to a patient for therapeutic purposes. In an embodiment, a host controller associated with hand piece 250 detects an activation signal when tip 260 is initially coupled to hand piece 250. In an embodiment, a host controller associated with hand piece 250 detects an activation signal when device 200 transitions from a power-off state to a power-on state. Tip 260 includes electrode patterns that are designed to deliver the RF energy in a specific pattern and density to the patient during the therapeutic procedure. Sensor data indicative of a temperature of tip 260 is obtained using temperature sensors (e.g., thermistors) included in tip 260. Moreover, a shape of tip 260 defined by the peripheral boundaries of tip 260 is designed to meet any positioning restrictions introduced by a specific therapeutic procedure.

In an embodiment, tip 260 is configured to be driven by RF generator 230 in a monopolar configuration. When tip 260 is driven in a monopolar configuration, device 200 further includes a return pad. The return pad provides a return path for RF current from the treatment area of the patient to the system during the therapeutic procedure. An example of a monopolar configuration is depicted in FIG. 3. In an embodiment, tip 260 is configured to be driven by RF generator 230 in a bipolar configuration. When tip 260 is driven in a bipolar configuration, device 200 would not include a return pad. Instead, tip 260 includes at least one additional electrode that provides a return path for RF current from the treatment area of the patient to the system during the therapeutic procedure.

In an embodiment, one or more of HMI 220, RF generator 230, power supply 240, and hand piece 250 includes a lower level controller. In an embodiment, a lower level controller provides SCM 210 with status messages related to a corresponding component. For example, a lower level controller of RF generator 230 may provide SCM 210 with status messages related to the peak/average power level of RF energy that is present at an output of RF generator 230. As another example a lower level controller of power supply 240 may provide SCM 210 with status messages related to device-level and component-level power consumption information.

In an embodiment, a lower level controller modifies the operation of a corresponding component, as instructed by SCM 210. For example, a lower level controller of power supply 240 may deliver (or withhold) electrical power to particular components, as instructed by SCM 210. As another example, a lower level hardware controller of hand piece 250 may activate (or deactivate) the controls for effectuating at least a subset of functionalities provided by device 200, as instructed by SCM 210.

In an embodiment, at least a subset of the components forming device 200 are contained within a console (or mechanical enclosure). For example, the console may contain SCM 210, RF generator 230, and power supply 240. In an embodiment, hand piece 250 is physically coupled to the console via the flexible conduit enclosing conductors that electrically couple hand piece 250 to the other components of device 200. In an embodiment, HMI 220 is disposed on an outward facing surface of the console containing at least a subset of the components forming device 200.

Figure 3:
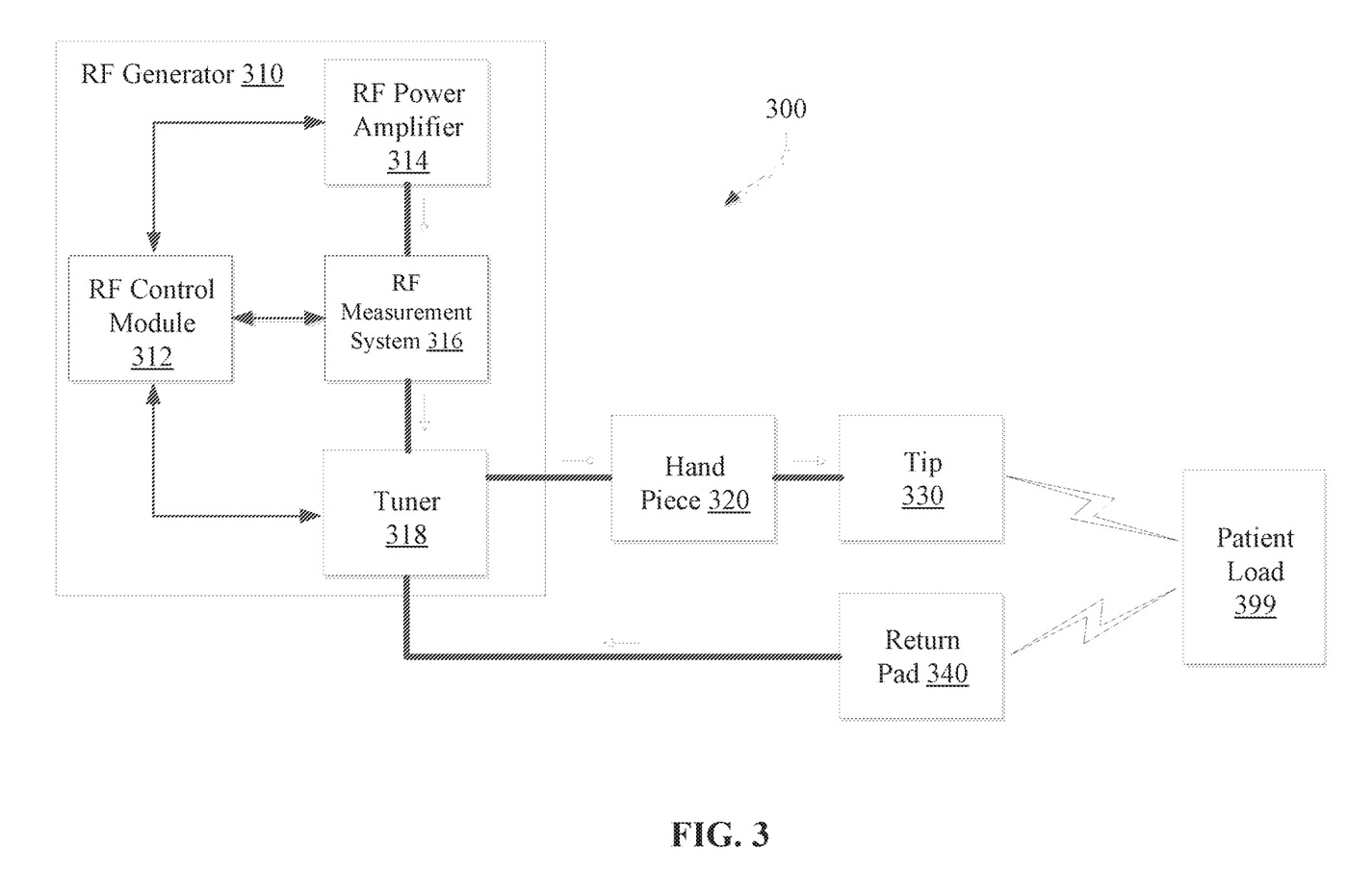
FIG. 3 is a block diagram of an example RF propagation path formed by components of an energy-based therapeutic device that is suitable for implementing aspects of the invention described herein.

FIG. 3 is a block diagram of an example RF propagation path ("RF path") 300 formed by components of an energy-based therapeutic device (e.g., energy-based therapeutic device 200) that is suitable for implementing aspects of the invention described herein. From a perspective of the device, a patient represents an electrical load that consumes radio frequency energy ("RF energy") emitted by the device during a therapeutic procedure. As such, for purposes of the present disclosure, the patient is represented by patient load 399 in FIG. 3.

As depicted in FIG. 3, the device portion of RF path 300 includes RF generator 310, hand piece 320, tip 330, and return pad 340. In an embodiment, RF generator 310, hand piece 320, and tip 330 are implemented using RF generator 230, hand piece 250, and tip 260 of FIG. 2, respectively. RF generator 310 includes a lower level hardware controller represented in FIG. 3 by RF control module 312. RF control module 312 is generally configured to control the various functionalities and operations of RF generator 310 and perform digital signal processing in support of those functionalities and operations. RF control module 312 is also configured to communicate with a high level hardware controller (e.g., SCM 210 of FIG. 2) to receive operating instructions and send status messages during operation.

In operation, the RF energy that propagates along RF path 300 towards patient load 399 begins at radio frequency power amplifier ("RF power amplifier") 314. RF power amplifier 314 is configured to generate RF energy at a center frequency and amplitude specified by RF control module 312. The center frequency of the RF energy is set using an internal reference oscillator of RF power amplifier 314 or an external frequency reference. The amplitude of the RF energy is established and maintained using a variable power supply of RF power amplifier 314.

RF measurement system 316 is configured to obtain measurements that characterize the complex forward and reflected RF waveforms, such as phase and voltage, that are present at an output of RF power amplifier 314. RF measurement system 316 is further configured to generate calibration signals for adjusting the impedance matching and remote current balancing functionalities effectuated by tuner 318. RF energy at an output of tuner 318 further propagates along RF path 300 towards hand piece 320.

In accordance with operator input (subject to any restrictions imposed by a higher level hardware controller, such as SCM 210 of FIG. 2), tip 330 receives RF energy from an interface with hand piece 320 and capacitively couples that RF energy to patient load 399. In FIG. 3, tip 330 is configured to be driven by RF generator 310 in a monopolar configuration. Accordingly, RF path 300 includes return pad 340 to provide a return path for RF current from patient load 399, as RF energy is applied. If tip 330 was configured to be driven by RF generator 310 in a bipolar configuration, RF path 300 would not include return pad 340. Instead, tip 330 would include at least one additional electrode to provide the return path for RF current. RF control module 31 monitors information obtained using the RF current present on the return path to further calibrate the operation of RF generator 310.

Figure 4:
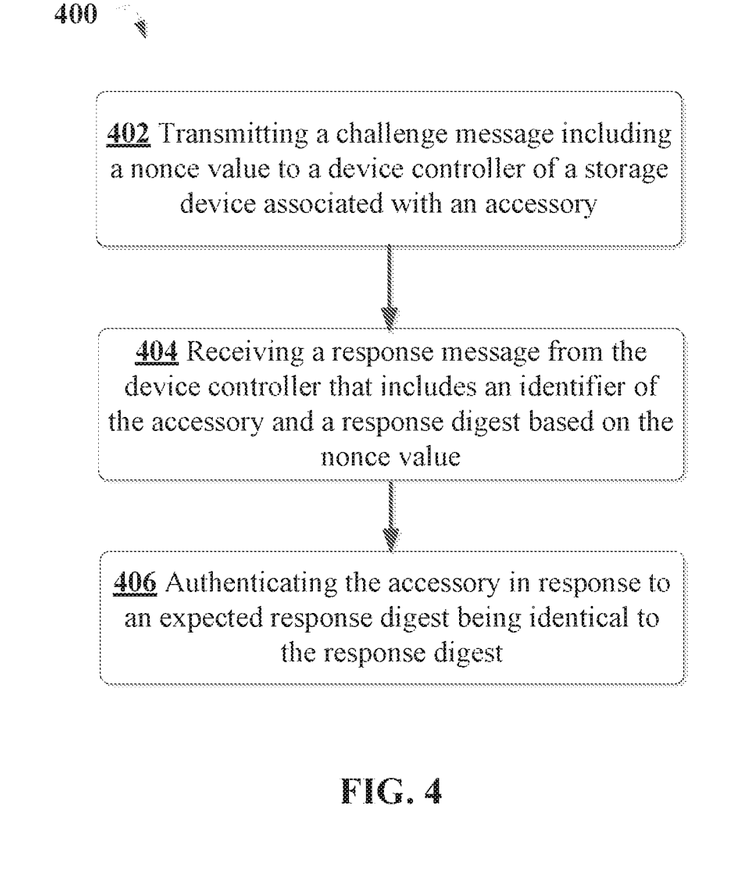
FIG. 4 is a flow-chart illustrating an example process of authenticating an accessory prior to activation.

FIG. 4 is a flow-chart illustrating an example process 400 of authenticating an accessory prior to activation. In an embodiment, process 400 is effectuated by host controller 120 of FIG. 1. In an embodiment, the accessory is HMI 220, RF generator 230, power supply 240, hand piece 250, or tip 260 of FIG. 2. In an embodiment, the accessory is RF generator 310, a component of RF generator 310, hand piece 320, tip 330, or return pad 340 of FIG. 3. At block 402, a challenge message including a nonce value is transmitted to a device controller of a storage device associated with the accessory. As used herein, a "nonce value" denotes a randomly or pseudo-randomly generated value. In an embodiment, the challenge message is communicated to the device controller in response to the host controller detecting an activation signal associated with the accessory. In an embodiment, the host controller detects the activation signal at a first interface and communicates the challenge message via a second interface that is distinct from the first interface.

At block 404, a response message is received from the device controller in response to the challenge message. In an embodiment, the response message includes an identifier of the accessory and a response digest generated by the device controller based on the nonce value and a device secret. As used herein, a "secret" denotes a secure value that is analogous to a "private key" in that it is generally only provided to intended recipients. In an embodiment, the device controller generates the response digest by applying the nonce value and the device secret to an input of a cryptographic hash function. In an embodiment, the device controller generates the response digest by applying the nonce value, the identifier, and the device secret to an input of a cryptographic hash function.

One skilled in the art will recognize that a "cryptographic hash function" refers to an algorithm that produces an irreversible and unique digest (or hash value) of a fixed size at an output in response to receiving a string of values of any length as an input. Examples of suitable cryptographic hash functions include: the MD5 message-digest algorithm, Secure Hash Algorithm 1, Secure Hash Algorithm 2, RACE Integrity Primitives Evaluation Message Digest-160, and the like.

At block 406, the accessory is authenticated in response to an expected response digest being identical to the response digest. In an embodiment, authenticating the accessory includes determining the device secret by applying the identifier and a host secret to an input of a cryptographic hash function. In an embodiment, the cryptographic hash function used to determine the device secret is a first hash function and the cryptographic hash function that the device controller uses to generate the response digest is a second hash function that is distinct from the first hash function.

In an embodiment, authenticating the accessory includes verifying that the identifier is one of a plurality of authorized identifiers. In an embodiment, verifying that the identifier is one of the plurality of authorized identifiers includes forwarding the identifier to a high-level host controller. In an embodiment, a data structure identifying the plurality of authorized identifiers is located in a memory that is accessible to the host controller. In an embodiment, the plurality of authorized identifiers includes a contiguous range of identifiers. In an embodiment, the plurality of authorized identifiers includes a contiguous range of identifiers and at least one identifier that is external to the contiguous range of identifiers.

Figure 5:
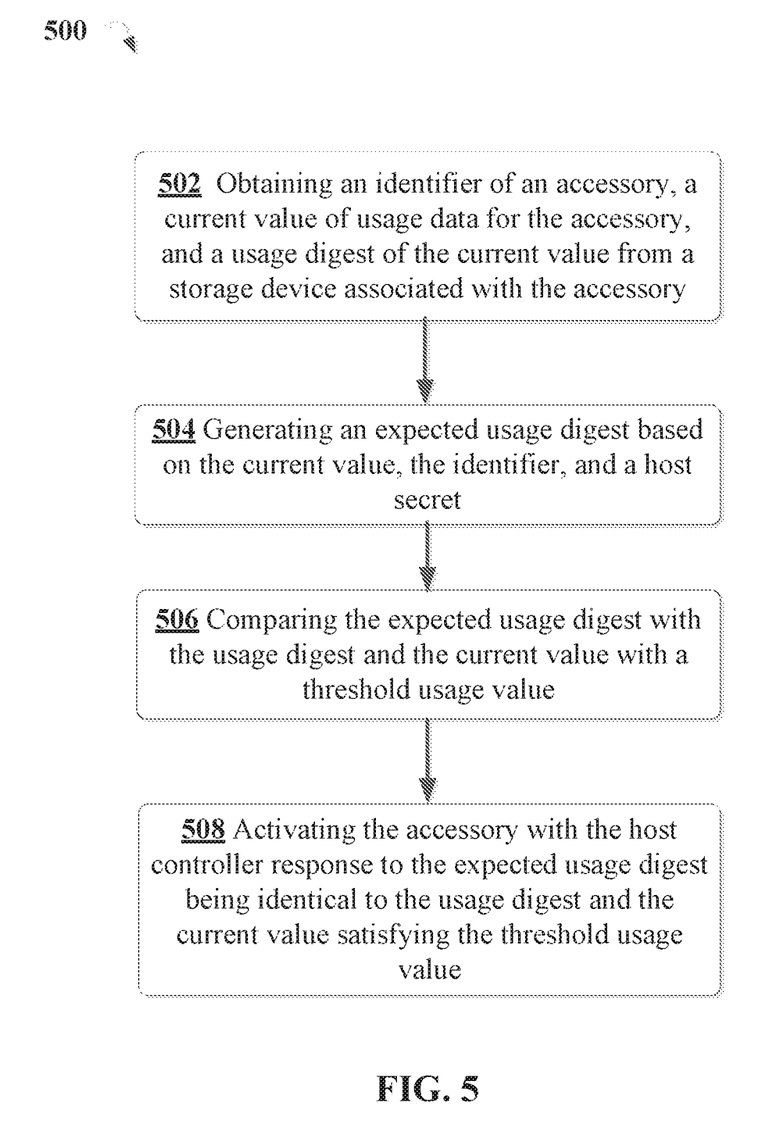
FIG. 5 is a flow-chart illustrating an example process of authenticating an accessory prior to activation.

FIG. 5 is a flow-chart illustrating another example process 500 of authenticating an accessory prior to activation. At block 502, obtaining an identifier of the accessory, a current value of usage data for the accessory, and a usage digest of the current value from a storage device associated with the accessory. In an embodiment, the storage device is incorporated into or attached to the accessory. In an embodiment, the storage device is physically remote from the accessory. In an embodiment, the storage device is a dedicated removable storage device that is separate and distinct from the corresponding accessory.

In an embodiment, the usage value corresponds to a number of times that energy has been applied to a treatment area of a patient using the accessory. For example, if the accessory is a tip and the energy is RF energy, the usage value may correspond to a number of RF pulses (e.g., 5 RF pulses) that have been applied to a treatment area of a patient using the tip. In an embodiment, the usage value corresponds to an aggregate amount of time that the accessory has actively applied energy to a treatment area of a patient. Continuing from the previous example, if the tip has applied five RF pulses to a treatment area of a patient and each RF pulse is 1 millisecond ("ms") in duration, a current value for the usage value is 5 ms. In an embodiment, the usage value is associated with a functional state of the accessory. In an embodiment, operation of a host system degrades the functional state of the accessory when the accessory is coupled to the host system. In this embodiment, degradation of the functional state corresponds to a deviation from manufacturer-established operating parameters or physical characteristics as a result of wear and tear.

In an embodiment, a read request is transmitted to a device controller of the storage device to obtain one or more of the identifier, the current value, and the usage digest. In an embodiment, the read request is transmitted by a host controller. In an embodiment, a device controller of the storage device issues a challenge message including a nonce value in response to receiving the read request. In an embodiment, read access to the storage device is granted when an expected response digest generated by the device controller is identical to a response digest received by the device controller. In an embodiment, the response digest is based on a device secret and the nonce value.

At block 504, generating an expected usage digest based on the current value, the identifier, and a host secret. In an embodiment, the host controller generates the expected usage digest by applying the current value, the identifier, and the host secret to an input of a cryptographic hash function. At block 506, comparing the expected usage digest with the usage digest and the current value with a threshold usage value. In an embodiment, the host controller designates the current value as valid when the expected usage digest is identical to the usage digest obtained from the storage device. In an embodiment, the host controller designates the current value as invalid when the expected usage digest is inconsistent with the usage digest obtained from the storage device. In an embodiment, the host controller refrains from activating the accessory when the current value is designated as invalid.

At block 508, activating the accessory with the host controller responsive to the expected usage digest being identical to the usage digest and the current value satisfying the threshold usage value. In an embodiment, the threshold usage value corresponds to a maximum time value. For example, in the example above where the current value for the usage value is 5 milliseconds, the threshold usage value may be defined as 10 milliseconds. In this example, if the current value is designated as valid, the accessory is activated with the host controller because the current value is less than the threshold usage value. Alternatively, if the current value is designated as invalid or the threshold value is defined as 4 milliseconds, the accessory would remain in an inactive state.

In an embodiment, the threshold usage value corresponds to a maximum count value. For example, in the example above where the current value for the usage value is 5 RF pulses, the threshold usage value may be defined as 8 RF pulses. In this example, if the current value is designated as valid, the accessory is activated with the host controller because the current value is less than the threshold usage value. Alternatively, if the current value is designated as invalid or the threshold usage value is defined as 5 RF pulses, the accessory would remain in an inactive state.

In an embodiment, process 500 further comprises monitoring the current value relative to the threshold usage value while the accessory is operating. For example, the current value may be monitored relative to the threshold usage value while the tip is delivering RF energy to a treatment area of a patient. In an embodiment, the accessory is deactivated when the current value breaches the threshold usage value.

In an embodiment, process 500 further comprises transmitting a write command to the device controller of the storage device, which includes data that updates the current value based on operation of the accessory subsequent to the host controller activating the accessory. In an embodiment, the write command further includes an updated usage digest that is generated based on an updated current value, the identifier, and the host secret. In an embodiment, a challenge including a nonce value is received from the device controller in response to the write command. In an embodiment, the device controller stores the data that updates the current value in a memory buffer of the storage device upon receiving the write command.

In an embodiment, the device controller updates the current value in the storage device with the data responsive to a response digest being identical to an expected response digest generated by the device controller. In an embodiment, the expected response digest is generated by the device controller based on the nonce value, the data, and the device secret. In an embodiment, the device controller flushes the data that updates the current value from the memory buffer responsive to a response digest being inconsistent with an expected response digest generated by the device controller.

In an embodiment, process 500 further comprises querying the device controller to obtain first use data for the accessory prior to activating the accessory. In an embodiment, the first use data is a timestamp corresponding to an initial use of the accessory that is defined by a date, a time, or a combination thereof. In an embodiment, the first use data is stored in a write-once memory location of the storage device. In an embodiment, process 500 further comprises receiving an indication from the device controller prior to activating the accessory that the first use data is unavailable for the accessory. In an embodiment, process 500 further comprises transmitting a write command to the device controller of the storage device comprising first use data upon activating the accessory in response to receiving the indication.

In an embodiment, process 400 and/or process 500 is effectuated by host controller 120 of FIG. 1. In an embodiment, the host controller of process 400 and/or process 500 is a high-level hardware controller. In an embodiment, the host controller of process 400 and/or process 500 is a low-level hardware controller. In an embodiment, the accessory of process 400 and/or process 500 is HMI 220, RF generator 230, power supply 240, hand piece 250, or tip 260 of FIG. 2. In an embodiment, the accessory of process 400 and/or process 500 is RF generator 310, a component of RF generator 310, hand piece 320, tip 330, or return pad 340 of FIG. 3. In an embodiment, process 400 and/or process 500 is performed by processing logic, including hardware, firmware, software, or a combination thereof. In an embodiment, process 400 and/or process 500 is performed by a processor executing code stored in a non-transitory computer-readable medium (e.g., a memory).

Figure 6:
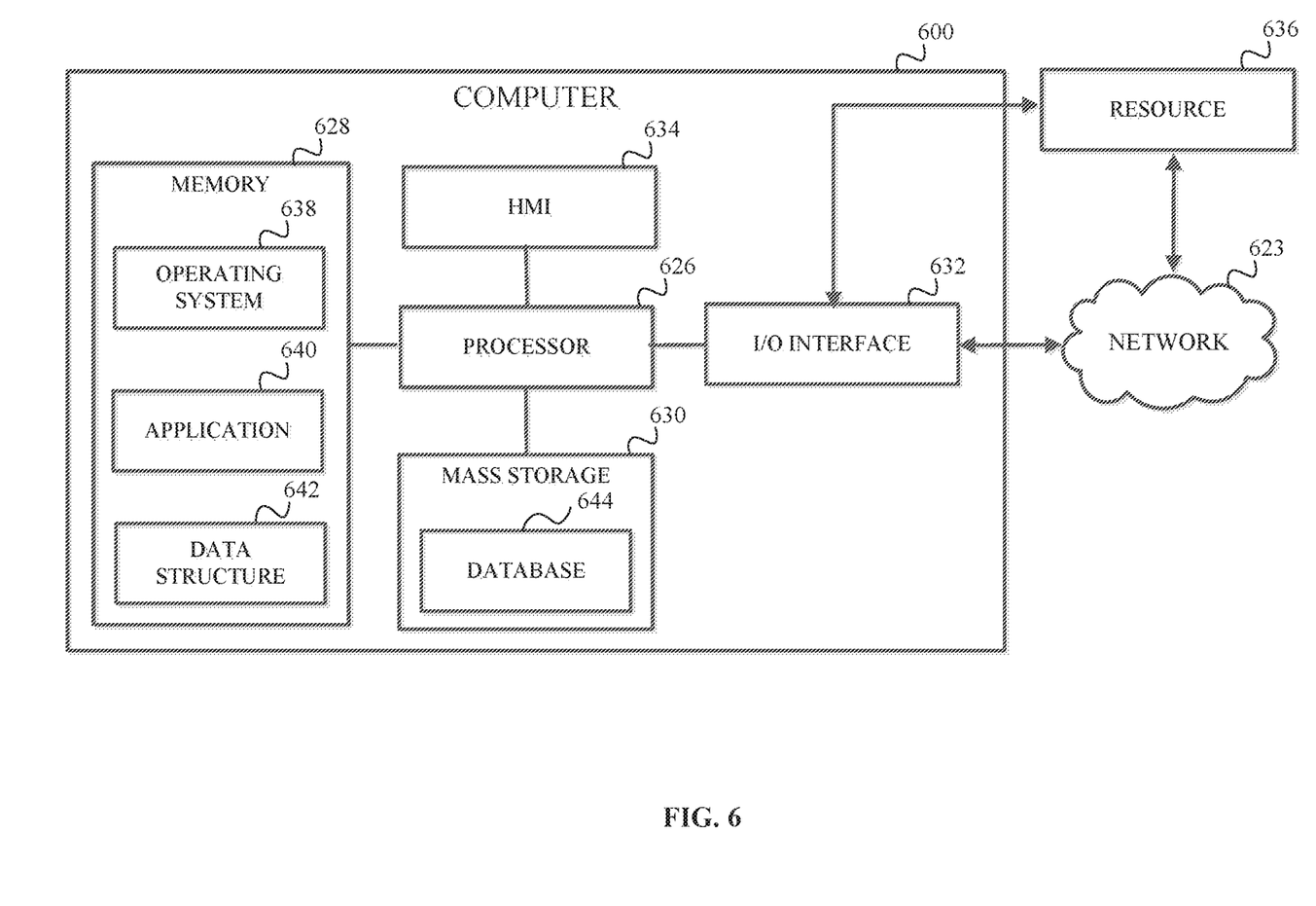
FIG. 6 is a block diagram of an example computing environment suitable for use in implementing embodiments of the invention.

Having described various embodiments of the invention, an exemplary computing environment suitable for implementing embodiments of the invention is now described. With reference to FIG. 6, host controller 120, storage device 130, system control module 210, RF generator 230, and RF generator 310 may be implemented on one or more computer devices or systems, such as exemplary computer system 600. The computer system 600 may include a processor 626, a memory 628, a mass storage memory device 630, an input/output (I/O) interface 632, and a Human Machine Interface (HMI) 634. The computer system 600 may also be operatively coupled to one or more external resources 636 via the network 623 or I/O interface 632. External resources may include, but are not limited to, servers, databases, mass storage devices, peripheral devices, cloud-based network services, or any other suitable computer resource that may be used by the computer system 600.

The processor 626 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 628. The memory 628 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 630 may include data storage devices such as a hard drive, optical drive, tape drive, non-volatile solid state device, or any other device capable of storing information.

The processor 626 may operate under the control of an operating system 638 that resides in the memory 628. The operating system 638 may manage computer resources so that computer program code embodied as one or more computer software applications, such as an application 640 residing in memory 628, may have instructions executed by the processor 626. In an alternative embodiment, the processor 626 may execute the application 640 directly, in which case the operating system 638 may be omitted. One or more data structures 642 may also reside in memory 628, and may be used by the processor 626, operating system 638, or application 640 to store or manipulate data.

The I/O interface 632 may provide a machine interface that operatively couples the processor 626 to other devices and systems, such as the network 623 or the one or more external resources 636. The application 640 may thereby work cooperatively with the network 623 or the external resources 636 by communicating via the I/O interface 632 to provide the various features, functions, applications, processes, or modules comprising embodiments of the invention. The application 640 may also have program code that is executed by the one or more external resources 636, or otherwise rely on functions or signals provided by other system or network components external to the computer system 600. Indeed, given the nearly endless hardware and software configurations possible, persons having ordinary skill in the art will understand that embodiments of the invention may include applications that are located externally to the computer system 600, distributed among multiple computers or other external resources 636, or provided by computing resources (hardware and software) that are provided as a service over the network 623, such as a cloud computing service.

The HMI 634 may be operatively coupled to the processor 626 of computer system 600 in a known manner to allow a user to interact directly with the computer system 600. The HMI 634 may include video or alphanumeric displays, a touch screen, a speaker, and any other suitable audio and visual indicators capable of providing data to the user. The HMI 634 may also include input devices and controls such as an alphanumeric keyboard, a pointing device, keypads, pushbuttons, control knobs, microphones, etc., capable of accepting commands or input from the user and transmitting the entered input to the processor 626.

A database 644 may reside on the mass storage memory device 630, and may be used to collect and organize data used by the various systems and modules described herein. For example, device memory 134 may be implemented using one or more databases, such as database 644. The database 644 may include data and supporting data structures that store and organize the data. In particular, the database 644 may be arranged with any database organization or structure including, but not limited to, a relational database, a hierarchical database, a network database, or combinations thereof. A database management system in the form of a computer software application executing as instructions on the processor 626 may be used to access the information or data stored in records of the database 644 in response to a query, where a query may be dynamically determined and executed by the operating system 638, other applications 640, or one or more modules.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed:

1. A system for authenticating an accessory used to perform a therapeutic procedure, the system comprising:
   a host controller;
   a processor; and
   a computer-readable storage medium comprising instructions that, upon execution by the processor, cause the system to perform operations, the operations comprising:
      obtaining an identifier of the accessory, a current value of usage data for the accessory, and a usage digest of the current value from a storage device associated with the accessory, wherein the usage data corresponds to a number of times or an aggregate amount of time that electrical energy has been delivered from the accessory;
      generating an expected usage digest based on the current value, the identifier, and a host secret;
      comparing the expected usage digest with the usage digest and the current value with a threshold usage value to authenticate the accessory;
      activating the accessory with the host controller, responsive to the expected usage digest being identical to the usage digest and the current value satisfying the threshold usage value, to permit the therapeutic procedure to be performed by delivering electrical energy from the accessory to a treatment area of a patient; and
      updating the usage digest based on tracking the delivered electrical energy from the accessory.

2. The system of claim 1, wherein the instructions, when executed, further cause the system to perform additional operations, the additional operations comprising:
   authenticating the accessory responsive to an expected response digest being identical to a response digest generated by a device controller of the storage device, the response digest generated by the device controller based on a nonce value and a device secret, the nonce value included in a challenge received by the device controller.

3. The system of claim 2, wherein authenticating the accessory comprises:
   determining the device secret based on the identifier and the host secret using a cryptographic hash function.

4. The system of claim 1, wherein the accessory forms part of a propagation path of an energy-based therapeutic device, and the electrical energy is delivered at a radio-frequency to the treatment area of the patient.

5. The system of claim 1, wherein the instructions, when executed, further cause the system to perform additional operations, the additional operations comprising:
   monitoring the current value relative to the threshold usage value while the accessory is operating; and
   deactivating the accessory when the current value breaches the threshold usage value.

6. The system of claim 1, wherein the instructions, when executed, further cause the system to perform additional operations, the additional operations comprising:
   transmitting a write command to a device controller of the storage device the write command including data that updates the current value based on operation of the accessory subsequent to the host controller activating the accessory; and
   in response to the write command, receiving a challenge from the device controller that includes a nonce value.

7. The system of claim 6, wherein the device controller updates the current value in the storage device with the data responsive to a response digest being identical to an expected response digest generated by the device controller, the expected response digest generated by the device controller based on the nonce value, the data, and a device secret.

8. The system of claim 6, wherein the write command further includes an updated usage digest that is generated based on an updated current value, the identifier, and the host secret.

9. The system of claim 1, wherein the accessory is a replaceable treatment tip of an energy-based therapeutic device, and the replaceable treatment tip is configured to deliver radio-frequency energy to the treatment area of the patient.

10. The system of claim 1, wherein operation of a host system degrades a functional state of the accessory when the accessory is coupled to a host system.

11. A method for authenticating an accessory used to perform a therapeutic procedure, the method comprising:
   obtaining an identifier of the accessory, a current value of usage data for the accessory, and a usage digest of the current value from a storage device associated with the accessory, wherein the usage data corresponds to a number of times or an aggregate amount of time that electrical energy has been delivered from the accessory;
   generating an expected usage digest based on the current value, the identifier, and a host secret;
   comparing the expected usage digest with the usage digest and the current value with a threshold usage value to authenticate the accessory;
   activating the accessory with a host controller, responsive to the expected usage digest being identical to the usage digest and the current value satisfying the threshold usage value, to permit the therapeutic procedure to be performed by delivering electrical energy from the accessory to a treatment area of a patient; and
   updating the usage digest based on tracking the delivered electrical energy from the accessory.

12. The method of claim 11, further comprising:
   authenticating the accessory responsive to an expected response digest being identical to a response digest generated by a device controller of the storage device, wherein the response digest generated by the device controller based on a nonce value and a device secret, and the nonce value included in a challenge received by the device controller.

13. The method of claim 12, wherein authenticating the accessory comprises:
   determining the device secret based on the identifier and the host secret using a cryptographic hash function.

14. The method of claim 12, wherein authenticating the accessory comprises:
   verifying that the identifier is one of a plurality of authorized identifiers.

15. The method of claim 11, wherein the accessory forms part of a propagation path of an energy-based therapeutic device configured to deliver radio-frequency energy to the treatment area of the patient.

16. The method of claim 11, further comprising:
   monitoring the current value relative to the threshold usage value while the accessory is operating; and
   deactivating the accessory when the current value breaches the threshold usage value.

17. The method of claim 11, further comprising:
   transmitting a write command to a device controller of the storage device the write command including data that updates the current value based on operation of the accessory subsequent to the host controller activating the accessory; and in response to the write command, receiving a challenge from the device controller that includes a nonce value.

18. The method of claim 17, wherein the device controller updates the current value in the storage device with the data responsive to a response digest being identical to an expected response digest generated by the device controller, the expected response digest generated by the device controller based on the nonce value, the data, and a device secret.

19. The method of claim 17, wherein the write command further includes an updated usage digest that is generated based on an updated current value, the identifier, and the host secret.

20. A non-transitory computer-readable storage medium comprising computer-readable instructions that upon execution by a processor of a computing device cause the computing device to:

obtain an identifier of an accessory, a current value of usage data for the accessory, and a usage digest of the current value from a storage device associated with the accessory, wherein the usage data corresponds to a number of times or an aggregate amount of time that electrical energy has been delivered from the accessory;

generate an expected usage digest based on the current value, the identifier, and a host secret;

compare the expected usage digest with the usage digest and the current value with a threshold usage value to authenticate the accessory;

activate the accessory with a host controller, responsive to the expected usage digest being identical to the usage digest and the current value satisfying the threshold usage value, to permit a therapeutic procedure to be performed by delivering electrical energy from the accessory to a treatment area of a patient and update the usage digest based on tracking the delivered electrical energy from the accessory.

21. The system of claim 1, wherein the storage device is a removable device that is separate and distinct from the accessory associated with the storage device.

22. The method of claim 14 wherein verifying that the identifier is one of the plurality of authorized identifiers comprises:

forwarding the identifier to the host controller, wherein a data structure identifying the plurality of authorized identifiers is located in a memory that is accessible to the host controller.

23. The method of claim 22 wherein the plurality of authorized identifiers includes a contiguous range of identifiers and at least one identifier that is external to the contiguous range of identifiers.

* * * * *